United States Patent [19]
Sanders et al.

[11] 3,910,964
[45] Oct. 7, 1975

[54] PROCESS FOR PRODUCTION OF ISOCHROMANS

[75] Inventors: James Milton Sanders, Eatontown; Loren Hall Michael, Freehold, both of N.J.

[73] Assignee: International Flavors & Fragrances Inc., New York, N.Y.

[22] Filed: May 1, 1974

[21] Appl. No.: 466,068

[52] U.S. Cl. ................................... 260/345.2
[51] Int. Cl.² .................................. C07D 311/02
[58] Field of Search ........................ 260/345.2

[56] References Cited
UNITED STATES PATENTS
3,360,530   12/1967   Heeringa et al. ........... 260/345.2
FOREIGN PATENTS OR APPLICATIONS
4,736,385   12/1972   Japan ..................... 260/345.1

OTHER PUBLICATIONS
Rieche et al., Ber., 89, 1254 (1956).
Sandler et al., Org. Functional Group Prep., Vol. III, pp. 2–5, 59, 60 (1972).

*Primary Examiner*—James O. Thomas, Jr.
*Assistant Examiner*—Nicky Chan
*Attorney, Agent, or Firm*—Arthur L. Liberman, Esq.; Harold Haidt, Esq.

[57] ABSTRACT

Process for producing isochromans having the structure:

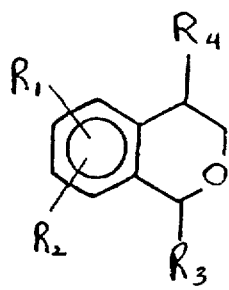

wherein $R_1$ and $R_2$ are each (i) separately selected from the group consisting of hydrogen, lower alkoxyl, lower alkyl, and, (ii) taken together, selected from the group consisting of benzo, cyclopentano, cyclohexano, naphtho, monoalkyl cyclopentano, polyalkyl cyclopentano, monoalkyl cyclohexano and polyalkyl cyclohexano, and $R_3$ and $R_4$ are the same or different and are selected from the group consisting of hydrogen and lower alkyl comprising the steps of intimately admixing:

A. An alkanol having the structure:

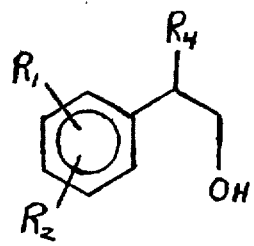

B. An acetal having the structure:

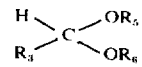

(wherein $R_5$ and $R_6$ are the same or different alkyl); and

C. A protonic acid selected from the group consisting of p-toluene sulfonic acid and phosphoric acid.

and heating the resulting mixture for a period of time whereby a substantial amount of the isochroman having the above structure is formed.

10 Claims, No Drawings

PROCESS FOR PRODUCTION OF ISOCHROMANS

BACKGROUND OF THE INVENTION

The production of isochromans has been shown in the art and certain novel isochromans have recently been disclosed with an outstanding musk fragrance. Such isochromans especially adapted for perfumery by virtue of their fragrance properties have been disclosed in Heeringa and Beets U.S. Pat. No. 3,360,530, issued on Dec. 26, 1967.

A number of routes are available for the production of isochromans, such as those set forth in U.S. Pat. No. 3,360,530 and one of the most straightforward of these routes is treatment of a Friedel-Crafts reactant with an alkylene oxide under Friedel-Crafts conditions to form an aryl alkanol. The aryl alkanol is then isolated and thereafter reacted with formaldehyde to cyclialkylate the alcohol. The efficiency of this multistage process leaves much to be desired because of yield impairment due to the large amount of working required.

U.S. Pat. No. 3,532,719 set forth a process for producing such isochromans which solved a number of the problems of the processes set forth in U.S. Pat. No. 3,360,530. U.S. Pat. No. 3,532,719 provided a more simplified more economical process for producing isochromans which comprises reacting a Friedel-Crafts reactant with an alkylene oxide in the presence of aluminum chloride to form an aryl alkanol, partially deactivating the aluminum chloride after formation of the aryl alkanol, and cyclialkylating the aryl alkanol with formaldehyde in the presence of the partially deactivated aluminum chloride to form the isochroman. The disadvantage of such procedures for the preparation of isochromans is in the second step wherein chloromethyl methyl ethers may be involved which have been reported to be health hazards and accordingly special precautions are required when handling. The preparation and use of such chloromethyl methyl ethers and the use of aluminum chloride complexes give rise to the release of hydrogen chloride vapors and formation of aqueous hydrogen chloride solutions requires the use of more expensive glass lined vessels due to the more corrosive mixtures in the reaction.

Steyn and Holzapfel, *Tetrahedron*, 23 4449 (1967), reports the reaction of a halo aryl alkanol with chloromethyl methyl ether and zinc chloride to give an isochroman according to the following reaction:

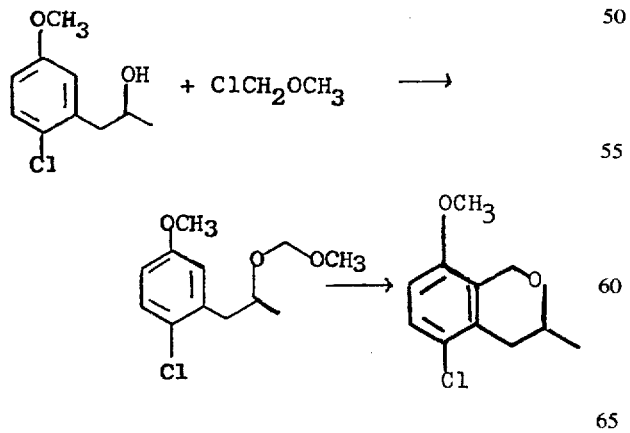

Meyer and Turner, *Tetrahedron*, 27 2609 (1971), reports the reaction of a methoxy aryl alkanol with sodium hydride and chloromethyl methyl ether to give a methoxy aryl alkanol methyl ether. Subsequent treatment of the methoxy aryl alkanol methyl ether with toluenesulfonic acid is indicated to yield isochromans according to the following reaction:

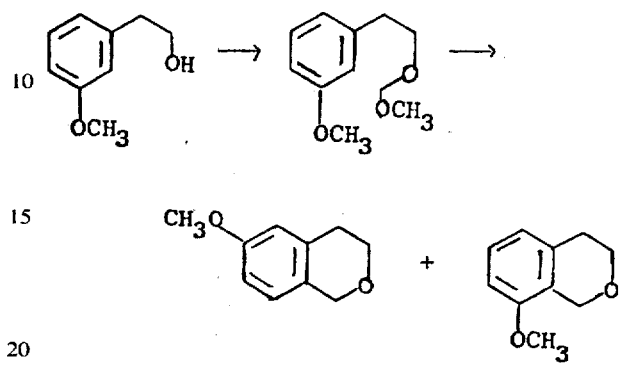

THE INVENTION

The present invention provides a simplified, economical process for producing isochromans from substituted aryl alkanols without the involvement of hydrogen chloride or corrosive halide salts or chloromethyl methyl ethers. More specifically, the present invention provides a process for preparing an isochroman having the structure:

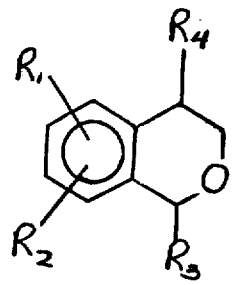

wherein $R_1$ and $R_2$ are each (i) separately selected from the group consisting of hydrogen, lower alkoxyl, lower alkyl, and (ii) taken together selected from the group consisting of benzo, cyclopentano, cyclohexano, naphtho, monoalkyl cyclopentano, polyalkyl cyclopentano, monoalkyl cyclohexano and polyalkyl cyclohexano, and $R_3$ and $R_4$ are the same or different and are selected from the group consisting of hydrogen and lower alkyl comprising the steps of admixing:

A. An alkanol having the structure:

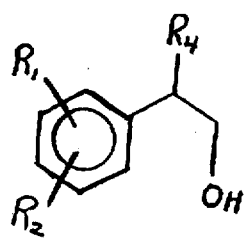

B. An acetal having the structure:

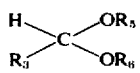

(wherein $R_5$ and $R_6$ are the same or different alkyl); and

C. A protonic acid selected from the group consisting of p-toluene sulfonic acid and phosphoric acid.

and heating the resultant mixture for a period of time whereby a substantial amount of isochroman is formed.

The above-mentioned acetal can be formed prior to use in the reaction or, it may be formed in situ.

The acid concentration in the reaction may be in the range of 1–100% weight/weight based on the total weight of other reagents charged. The preferred range depends upon the acid used. Two preferred acids which may be used are phosphoric acid and p-toluene sulfonic acid. When 85% phosphoric acid is used, the preferred concentration is 1 to 50% weight/weight based on the total of other reagents used.

Where the acetal is formed in situ, it is formed by reaction of an aldehyde and an alcohol. The concentration of the aldehyde may be in the range 0.1 mole up to 100 moles or more per mole of aryl alkanol. The preferred range is 1–5 moles of aldehyde per mole of aryl alkanol. The alcohol used to react with the aldehyde to form the acetal may be used in a concentration of 0.1–100 moles per mole of the aryl alkanol. If the aldehyde is taken in less than 0.5 moles per mole of aryl alkanol, it is probably not necessary to use more than 0.1 moles of alcohol per mole of aryl alkanol. When the aldehyde is taken in a amount greater than 0.5 mole per mole of aryl alkanol, the alcohol should be taken in an amount at least equal to twice the difference between the number of moles of aldehyde and half the number of moles of aryl alkanol whereby it is insured that all of the aldehyde is converted into an acetal to prevent self-condensation of the aldehyde under acidic reaction conditions. It is preferred to use an excess of alcohol over that required for complete conversion of the aldehyde to the acetal. If desired, the alcohol can also be used as a solvent for the reaction.

The reaction temperature may be in the range of 0° up to 200°C, the preferred range being 85°–150°C with the range of 120°–140°C being particularly preferred. The actual temperature range depends upon the acid used. Using the preferred 85% phosphoric acid, the reaction temperature range preferred is 120°–140°C.

The reaction pressure may be equal to, above or below atmospheric pressure so long as the necessary reaction temperature is obtained to give a reasonable rate of conversion to the isochroman. By suitable choice of reagents it is possible to carry out the reaction smoothly at atmospheric pressure, thereby avoiding the necessity of using more expensive pressure or vacuum equipment.

It must be emphasized that the reaction mixture using phosphoric acid or p-toluene sulfonic acid is significantly less corrosive than the prior art processes which give aqueous hydrogen chloride and release hydrogen chloride vapors. This permits the use of less expensive steel reaction vessels rather than the more expensive glass lined vessels required for the more corrosive mixture. Furthermore, in the instant process no chloromethyl methyl ethers are involved either as reagents or intermediates. This class of compound has been reported to be a severe health hazard requiring special precautions when handling.

According to the process of our invention the reactions can be represented as follows:

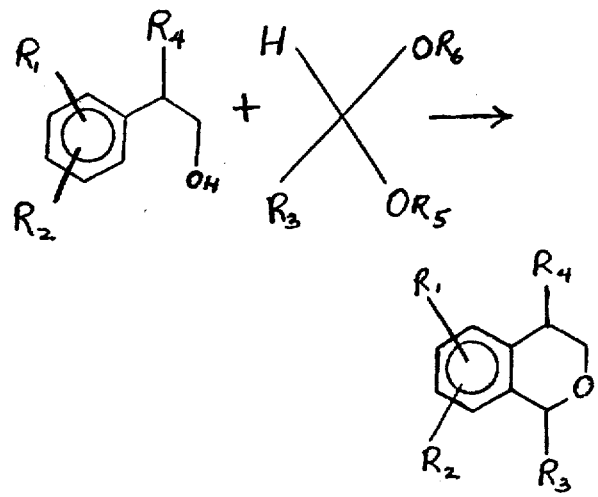

The acetal reactant may be formed ahead of time or in situ according to the following reaction:

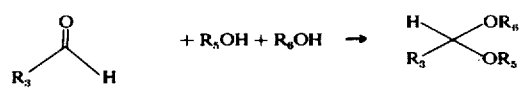

Examples of aryl alkanols that may be used in the reaction of our invention are as follows:

Phenyl ethyl alcohol
2-(1',1',2',3',3'-pentamethylindan-5'-yl)-1-propanol
[prepared according to the process of Example XV (b) of U.S. Pat. No. 3,360,530]
1-(2-hydroxyethyl)-3,5-diethylbenzene
1-(2-hydroxyethyl)-2-methoxy-4-methylbenzene
2-(1',1',2',3',3'-pentamethylindan-5'-yl)-ethanol
2-phenyl-1-propanol
2-(1',1',2',3',3'-pentamethylindan-5'-yl)-pentanol-1

Examples of aldehydes useful in forming the acetal reactants of the process of our invention are as follows:

Formaldehyde
Acetaldehyde
Propionaldehyde

Easily decomposable precursors of these aldehydes may be used in place of the aldehydes per se, for example paraformaldehyde (to produce formaldehyde) and paraldehyde (to produce acetaldehyde).

Examples of alcohols useful in forming the acetal reactant used in the process of our invention are as follows:

Methanol
Ethanol
n-propanol
2-propanol
n-butanol
n-pentanol
n-hexanol
2-methylpropanol-1
2-methylbutanol-1

In the above reactions, $R_1$ and $R_2$ are each (i) separately selected from the group consisting of hydrogen, lower alkoxyl, lower alkyl, and, (ii) taken together, selected from the group consisting of benzo, cyclopentano, cyclohexano, naphtho, monoalkyl cyclopentano, polyalkyl cyclopentano, monoalkyl cyclohexano and polyalkyl cyclohexano; $R_3$ and $R_4$ are the same or different and are selected from the group consisting of hydrogen and lower alkyl and $R_5$ and $R_6$ are the same or different alkyl. A specific example of one of the reactions of the process of our invention is the reaction of the hexyl alcohol acetal of formaldehyde with 2-(1',1',2',3',3'-pentamethylindan-5'-yl)-propanol-1 which yields 6-oxa-1,1,2,3,3,8-hexamethyl-2,3,5,6,7,8-hexahydro-1H-benz [f] indene as follows:

base such as aqueous sodium hydroxide or potassium hydroxide solution and the washed mixture is then treated by conventional techniques such as distillation, extraction, preparative chromatography, and the like, to obtain highly purified isochroman. Fractional distillation is a preferred method of recovering the isochroman.

The following examples are given to illustrate embodiments of the invention as it is presently preferred to practice it. It will be understood that these examples are illustrative, and the invention is not to be considered as restricted thereto except as indicated in the appended claims.

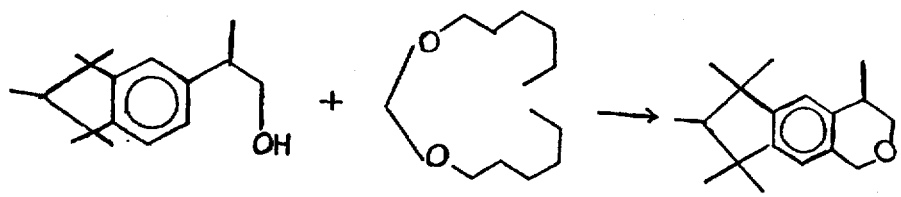

Another example of the process of our invention is the formation 2-oxa-4,5,5,8,8-pentamethyl-1,2,3,4,5,6,7,8-octahydroanthracene as follows:

EXAMPLE I

Into a 250 ml flask equipped with stirrer, thermometer, reflux condenser and heating mantle, the following materials are placed:

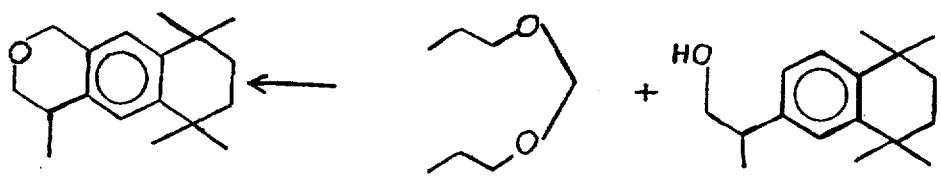

The same reaction whereby the acetal reactant is formed in situ is as follows:

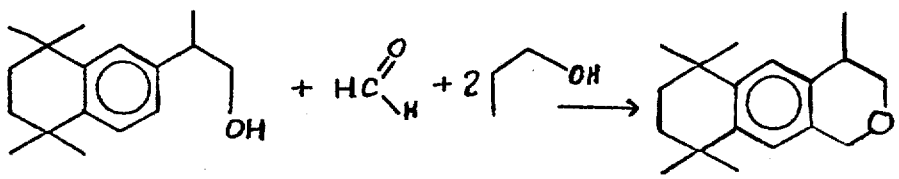

The same material may also be prepared using another reaction sequence which sequence includes a reaction which is an embodiment of our invention, thus:

2-(1',1',2',3',3'-pentamethylindan-5-yl)-1-propanol

[prepared according to the process of Example XV

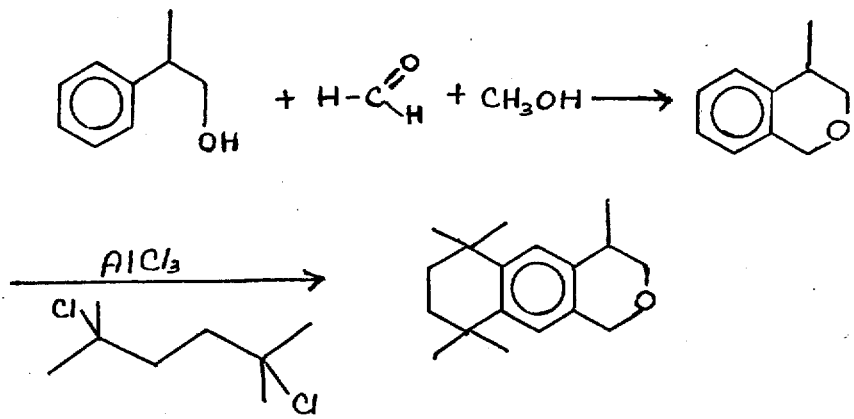

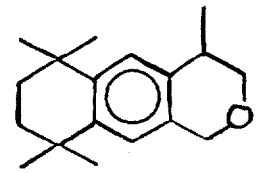

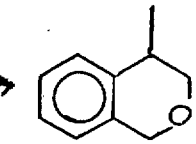

After the reaction of our invention to form the isochroman, the reaction mass is neutralized with aqueous (b) of U.S. Pat. No. 3,360,530] having the structure:

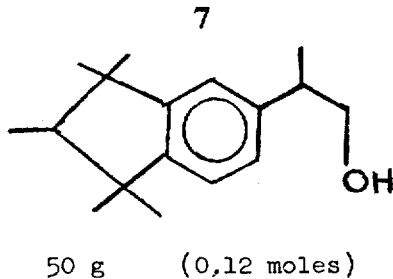

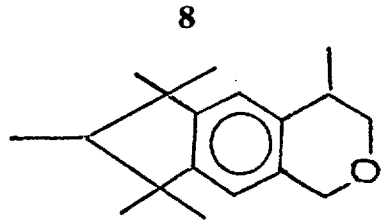

methylal having the structure:

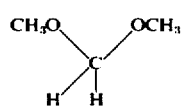   50 g p-toluene sulfonic acid 1 g

The reaction mass is heated at 50°C for a period of 26 hours. At the end of 14 hours of the reaction, an additional 0.5 g of p-toluene sulfonic acid is added. At the end of 19 hours an additional 10 g of methylal is added. After this period of time the reaction mass is neutralized with 10 cc of 25% aqueous sodium hydroxide solution. The two phases, the organic and the aqueous phase, are separated from one another and the organic phase is distilled at 155°–159°C at 3 mm Hg pressure. The reaction product obtained is 6-oxa-1,1,2,3,3,8-hexamethyl-2,3,5,6,7,8-hexahydro-1H-benz [f] indene having the structure:

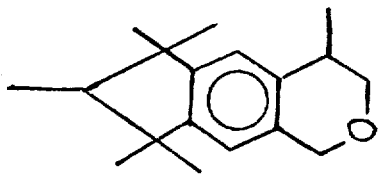

The structure is confirmed by GLC, mass spectral, IR and NMR analyses.

EXAMPLE II

Into a 250 ml reaction flask equipped with stirrer, thermometer, reflux condenser and Bidwell trap, the following materials are placed:

| | |
|---|---|
| 2-(1′,1′,2′,3′,3′-penta-methylindan-5′-yl)-1-propanol (56.9%) | 50 g (0.12 moles) |
| 1-hexanol | 37 g (0.36 moles) |
| paraformaldehyde | 4 g (0.132 moles) |
| p-toluene sulfonic acid | 1 g |

Over a 2 hour period the reaction mass is heated with stirring to 100°C. The Bidwell trap is then attached to the reactor and the reaction mass is heated to 140°C. The reaction mass is heated at 140°–175°C for a period of 4 hours, and then heated at a temperature in the range of 174°–185°C for a period of 6 hours. At the completion of the reaction, the reaction mass is neutralized with 10 cc of 25% aqueous sodium hydroxide solution. The resulting two phases are separated and the organic phase is distilled at 155°–159°C at 3 mm Hg pressure. The reaction product is a compound having the structure:

The structure is confirmed by GLC, NMR, mass spectral, and IR analyses. The final conversion based on the propanol derivative reactant is 60%.

EXAMPLE III

Into a 500 ml reaction flask equipped with stirrer, thermometer and reflux condenser, and Bidwell trap, the following materials are added:

| | |
|---|---|
| 2-(1′,1′,2′,3′,3′-penta-methylindan-5′-yl)-1-propanol (56.9%) | 50 g (0.12 moles) |
| chlorobenzene | 50 g |
| 1-hexanol | 49 g |
| 85% phosphoric acid | 1 g |
| paraformaldehyde | 4 g |

The reaction mass is heated to 100°C over a period of 2 hours. 15 g of 85% phosphoric acid is then added and the reaction mass is heated to 130°C over a period of 14 hours. 15 g of 85% phosphoric acid is added after 5 hours and another 15 g of 85% phosphoric acid is added at the end of the 14 hour period. The reaction mass is then heated at 128°–130°C for a period of 5 hours. The reaction is then neutralized with 100 cc of 25% sodium hydroxide and the aqueous phase is separated from the organic phase. The organic phase is distilled at a temperature of 155°–159°C at a pressure of 3 mm Hg yielding a compound having the structure:

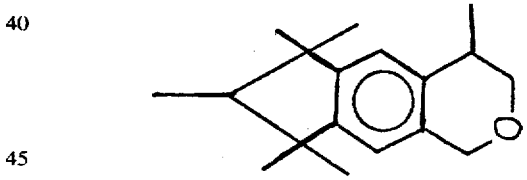

which is 6-oxa-1,1,2,3,3,8-hexamethyl-2,3,5,6,7,8-hexahydro-1H-benz [f] indene. This structure is confirmed by GLC, mass spectral, IR and NMR analyses. The conversion based on the propanol derivative is 100%.

EXAMPLE IV

Into a 500 ml reaction flask equipped with stirrer, reflux condenser and Bidwell trap, the following materials are added:

| | |
|---|---|
| 2′(1′,1′,2′,3′,3′-penta-methylindan-5′-yl)-1-propanol | 50 g (0.12 moles) |
| 2-methyl-1-butanol | 44 g (0.48 moles) |
| paraformaldehyde | 11 g (0.36 moles) |
| 85% phosphoric acid | 1 g |

The reaction mass is slowly heated to 100°C over a period of 3 hours. 15 g of 85% phosphoric acid is then added to the reaction mass and the reaction mass is heated to 130°C and maintained at that temperature for a period of 3 hours. At the end of the reaction, the reaction mass is neutralized with 500 cc of 25% sodium hydroxide and the organic phase is separated from the aqueous phase. The organic phase is distilled at 155°–159°C at 3 mm Hg pressure yielding the compound: 6-oxa-1,1,2,3,3-pentamethyl-2,3,5,6,7,8-hexahydro-1H-benz [f] indene. The structure is confirmed by IR, GLC, NMR and mass spectral analyses.

EXAMPLE V

Into a 5 liter glass reaction vessel equipped with a stirrer, thermometer, reflux condenser and heating mantle and following materials are placed:

| | |
|---|---|
| paraformaldehyde | 346 g (11.55 moles) |
| n-hexanol | 1885 g (18.5 moles) |
| phosphoric acid (85%) | 40 g |
| 2-(1',1',2',3',3'-pentamethylindan-5'-yl)-1-propanol [prepared according to the process of Example XV (b) of U.S. Patent 3,360,530] | 2000 g |

The reaction mass is stirred vigorously and heated to 105°C over a period of three hours. During this time 98 g of water is removed as an azeotrope with n-hexanol. After an additional 30 minutes, during which time the reaction temperature rises to 110°C and an additional 65 g of water is removed, 460 g of 85% phosphoric acid is added, and the reaction temperature is raised to 131°C in a period of 10 minutes. The reaction mass is stirred at 130°–133°C for 10 hours, and an additional 77 g of water is collected. At this point, GLC analysis (10 feet × ⅛ inch, 5% OV 101,200°C isothermal) shows essentially no detectible 2-(1',1',2',3'.3'-pentamethylindan-5'-yl)-1 propanol present. The reaction mixture is cooled to room temperature and then is poured into a mixture of 500 g of water and 500 g of crushed ice. The water layer is drained, 130 g of crushed ice is added to the organic layer, and 700 g of 20% sodium hydroxide solution is added to neutralize the remaining phosphoric acid. The organic layer is washed with 1 liter of water and with 1 liter of saturated sodium chloride solution. The washed organic material is rapidly distilled through a short column to give 1338 g of a mixture of n-hexanol (67.9%) and di-n-hexyl formal, (19.5%) [boiling point 100°C/300 mm Hg to 119°C/3.6 mm Hg] and 2235 g of material [boiling point 127°–149°C/3.0–3.4 mm Hg] which contains 33.4% di-n-hexyl formal and 58.8% 6-oxa-1,1,2,3,3,8-hexamethyl-2,3,5,6,6,8-hexahydro-1H-benz [f] indene. This material is fractionated at 3.0–3.1 mm Hg using a 12 × 1 inch Goodloe packed column to give 1402 g of 6-oxa-1,1,2,3,3,8-hexamethyl-2,3,5,6,7,8-hexahydro-1H-benz [f] indene, boiling point 151°–159°C/3.0–3.1 mm Hg.

EXAMPLE VI

Into a 250 ml flask equipped with stirrer, thermometer, reflux condenser and heating mantle the following materials are placed:

| | |
|---|---|
| 4-methyl-2-pentanol | 49 g |
| paraformaldehyde | 5 g |
| phosphoric acid | 1 g |
| 2-(1',1',2',3'.3'-pentamethylindan-5'-yl)-propanol [prepared according to the process of Example XV (b) of U.S. Patent 3,360,530] | 50 g |

The reaction mixture is heated to 108°C over a period of 2.5 hours and 1.5 ml of water is removed azeotropically. An additional 24 g of 85% phosphoric acid is added and the mass is heated at 130°C for 3 hours. GLC analysis indicated significant 6-oxa-1,1,2,3,3,8-hexamethyl-2,3,5,6,7,8-hexahydro-1H-benz [f] indene formation accompanied by extensive dehydration of the 4-methyl-2-pentanol and formation of significant amounts of non-volatile materials.

EXAMPLE VII

Into a 22 liter flask equipped with a stirrer, thermometer, addition funnel and Bidwell water separator with a reflux condenser are placed the following materials:

| | |
|---|---|
| Product prepared according to Example XV (b) of U.S. Patent 3,360,530 [contains 64.0% 2-(1',1',2',3',3'-pentamethylindan-5'-yl)-1-propanol and 17.4% of isomers of this compound] | 6000 g (19.85 moles) |
| 1-hexanol | 6000 g (58.82 moles) |
| Paraformaldehyde | 1191 g (39.7 moles) |
| 85% phosphoric acid | 120 g |

The mixture is heated with stirring to 100°C over a period of approximately 2 hours. Heating is continued to 106°C over a period of approximately 1.5 hours while collecting the water which distils over as an azeotrope with 1-hexanol. Approximately 296 g of water is collected. At this point an additional 1380 g of 85% phosphoric acid is added and heating is continued for 11 hours at 130°C and 2 hours at 140°C. During this period, another 451 g of water is collected. The mass is cooled to 30°C and poured with good agitation into a mixture of 2836 g of 50% sodium hydroxide solution and 2836 g of crushed ice to neutralize the phosphoric acid. The neutralization is exothermic, and raises the temperature of the mixture to approximately 62°C. Two liters of water are added and the mass is heated to 65°C to prevent precipitation of trisodium phosphate in the aqueous layer. The water layer is drained and the organic layer is distilled through an 8 inch column packed with ¼ inch porcelain saddles to give 113 g of a mixture of water and 1-hexanol (bp 84°C/84 mm Hg to 52°C/50 mm Hg) and 2337 g of material which is 95.7% 1-hexanol (bp 84°C/45 mm Hg to 60°C/30 mm Hg). The residue in the still pot (8987 g) is then distilled at 2–3 mm Hg using a 24 × 3 inch Goodloe packed column to give 3210 g of material (bp 48°–103°C at 3 mm Hg) containing 0.6% 1-hexanol and 89.1% di-n-hexyloxymethane, 802 g of intermediate fractions, and 3506 g of a product essentially identical with that prepared in Example XV of U.S. Pat. No. 3,360,530 containing 70.6% 6-oxa-1',1',2',3',3',8'-hexamethyl-2',3',5',6',7' ,8'-hexahydro-1H-benzo [f] indane.

EXAMPLE VIII

Into a 22 liter flask equipped with a stirrer, thermometer, addition funnel, and Bidwell water separator with a reflux condenser are charged the following materials:

| | |
|---|---|
| Product prepared according to Example XV (b) of U.S. Patent 3,360,530 [contains 64.0% 2-(1',1',2',3',3'-pentamethylindan-5'-yl)-1-propanol and 17.4% of other isomers] | 5000 g (16.5 moles) |
| Mixture of 45.9% 1-hexanol and 47.1% di-n-hexyloxymethane recovered from Example I | 5335 g |
| Paraformaldehyde | 384 g |
| 85% phosphoric acid | 100 g |

The mixture is heated with good agitation to a reaction temperature of 110°C over a period of approximately 4 hours. During this time 90 g water is distilled out as an azeotrope with 1-hexanol. An additional 1150 g of 85% phosphoric acid is added and the mixture is heated to 140°C for approximately 9 hours with good agitation. An additional 335 g of water is collected during this period. The mass is cooled to below 50°C and poured with good agitation into 5460 g of 25% sodium hydroxide solution at 50°–70°C. The water layer is drained and the organic layer is distilled using a 24 × 1.5 inch Goodloe packed column beginning at 25 mm Hg and reducing the pressure to 3.0 mm Hg during the distillation. This gives 241 g (28°–75°C at 25 mm Hg) of a mixture of water and 1-hexanol, 4611 g (bp 71°C/13 mm Hg to 120°C/3.0 mm Hg) of a mixture containing 58.3% 1-hexanol and 31.6% di-n-hexyloxymethane, 946 g (bp 146°–153°C/3.0 mm Hg) of intermediate fractions, and 2947 g (bp 154°–162°C/3.0 mm Hg) of a product essentially identical with that prepared according to Example XV of U.S. Pat. No. 3,360,530 and containing 69.9% 6-oxa-1',1',2',3',3',8'-hexamethyl-2',3',5',6',7',8'-hexahydro-1H-benz [f] indane.

EXAMPLE IX

PREPARATION OF 4-METHYL ISOCHROMAN

Into a 3 liter flask equipped with a stirrer thermometer, addition funnel, and Bidwell water separator with a reflux condenser are placed the following materials:

| | |
|---|---|
| 2-Phenylpropanol-1 | 272 g (2 moles) |
| Paraformaldehyde | 120 g (4 moles) |
| 1-Hexanol | 612 g (6 moles) |
| 85% Phosphoric acid | 3 g |

The mixture is heated with stirring to 105°C over a period of approximately three hours. Heating is continued at 105°–110°C for another 2 hours while approximately 25 g of water is removed as an azeotrope with 1-hexanol. At this point an additional 27 g of 85% phosphoric acid is added, and the mixture is heated to 140°C for 10 hours giving an additional 40 g water. The mass is cooled to 50°C and poured into 150 g of 25% aqueous sodium hydroxide solution at a temperature of 60°–70°C. The water layer is drained and the organic layer is distilled at reduced pressure through a 12 inch × 1.0 inch Goodloe packed column to give 20 g (bp 25°–75°C/25 mm Hg) of a mixture of water and 1-hexanol, 460 g (bp 70°C/12 mm Hg to 120°C/3 mm Hg) consisting of a mixture of 59% 1-hexanol and 30% di-n-hexyloxymethane, 90 g of intermediate fractions, and 175 g. (bp 70°C at 3 mm Hg) of 4-methylisochroman, having the structure:

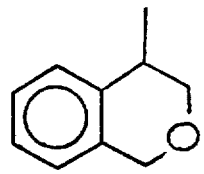

EXAMPLE X

PREPARATION OF 2-OXA-4,5,5,8,8-PENTAMETHYL-1,2,3,4,5 6,7,8-OCTAHYDROANTHRACENE

A suspension of 1000 g (7.5 moles) of aluminum chloride in 2 liters of dry carbon tetrachloride is cooled to −10°C. In the course of 1.5 hours there is added with vigorous stirring a solution of 444 g (3.0 moles) of 4-methylisochroman produced according to the method set forth in Example IX and 549 g (3.0 moles) of 2,5-dichloro-2,5-dimethylhexane in 1250 ml of dry carbon tetrachloride.

During the addition the temperature is maintained at −5° to −10°C by using an ice-salt bath while a vigorous stream of nitrogen is bubbled through the reaction mixture. After an additional stirring of a half an hour at 0°C, the reaction product is poured onto a mixture of 5 kilograms of ice and 600 ml of concentrated hydrochloric acid.

The resulting oil layer is separated and stirred for 2 hours at 50°C with 600 ml of a 50% alcoholic potassium hydroxide solution. The solution is then poured into 6 liters of water and the oil layer is separated. The solvent is distilled off and the crude product, 600 g, is distilled at 3 mm Hg pressure under nitrogen yielding 466 grams of distillate, boiling point 130°–200°C and 173 g of residue.

Upon fractionation of the distillate through a Vigreux type column of 8 theoretical plates, at 0.1 mm Hg under nitrogen there is obtained 275 g of the 2-oxa-4,5,5,8,8-pentamethyl-1,2,3,4,5,6,7,8-octahydroanthracene as a colorless viscous liquid, boiling point 126°–128°C at 0.1 mm Hg. The material is a white crystallized substance having a strong and tenacious musk odor. The structure as confirmed by mass spectrometry, NMR and IR analysis is confirmed as being:

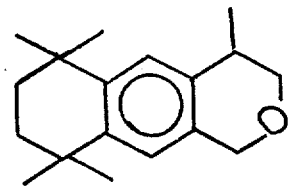

EXAMPLE XI

Into a 2 liter autoclave the following mixture is charged:

| Product prepared as in the process of Example XV (b) of U.S. Patent 3,360,530 containing 64.0% 2-(1',1',2',3',3')-pentamethylindanyl-5'-yl)-1-propanol | 470 g |
|---|---|
| Paraformaldehyde | 37 g |
| 85% phosphoric acid | 24 g |
| toluene | 410 g |

The autoclave is sealed and heated to 160°–170°C at autogenous pressure (40–44 psig) for approximately five hours. GLC analysis during the reaction (10 feet × ⅛ inch, 5% OV 101, 200°C isothermal) indicates a slow formation of the desired isochroman 6-oxa-1,1,2,3,3,8-hexamethyl-2,3,5,6,7,8-hexahydro-1H-benz [f] indene, (bp 151°–159°C/3.0–3.1 mm Hg). After the 5 hour reaction time the conversion to the isochroman is only approximately 20% of theory based on the total arylpropanol charged.

What is claimed is:

1. In the process for producing isochromans having the structure:

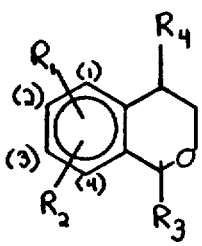

wherein $R_1$ and $R_2$ are each (i) separately, selected from the group consisting of hydrogen, lower alkoxyl, and lower alkyl, and (ii) taken together, when $R_1$ and $R_2$ are located at the "2" and "3" positions of the benzene ring, selected from the group consisting of benzo, cyclopentano, cyclohexano, naphtho, mono-lower alkyl cyclopentano, poly-lower alkyl cyclopentano, mono-lower alkyl cyclohexano and poly-lower alkyl cyclohexano, and $R_3$ and $R_4$ are the same or different and are selected from the group consisting of hydrogen and lower alkyl comprising the steps of intimately admixing:

A. An aryl alkanol having the structure:

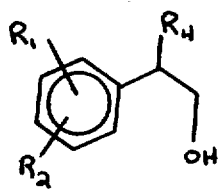

B. A methylenating-cyclizing agent capable of introducing the moiety:

between the oxygen atom and the number "5" carbon atom of the structure:

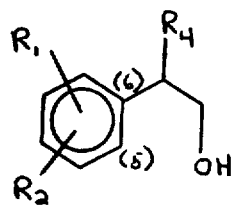

C. A catalyst for the reaction between said aryl alkanol and said methylenating-cyclizing agent and heating the resulting mixture for a period of time whereby a substantial amount of the isochroman having the above structure is formed; the improvement consisting of:

1. The methylenating-cyclizing agent being an acetal having the structure:

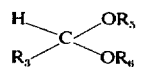

wherein $R_5$ and $R_6$ are the same or different straight chain lower alkyl;

2. The catalyst being a protonic acid selected from the group consisting of p-toluene sulfonic acid and phosphoric acid;

3. The reaction mass not containing at any time during or subsequent to the reaction any hydrogen chloride or corrosive halide salts or chloromethyl methyl ethers;

4. The reaction temperature being in the range of from 0° up to 200°C;

5. The acid concentration being from 1 up to 100% by weight based on the weight of the remainder of the reaction mass; and 6. The ratio of acetal to aryl alkanol being at least 0.1:1.

2. The process of claim 1 wherein the aryl alkanol has the structure:

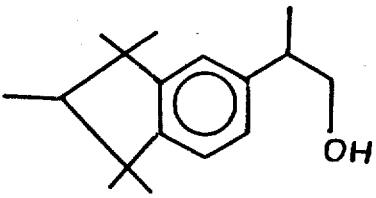

3. The process of claim 1 wherein the acetal is methylal.

4. The process of claim 2 wherein the acetal is methylal.

5. The process of claim 1 wherein the acetal is the dihexyl acetal of formaldehyde.

6. The process of claim 2 wherein the acetal is the dihexyl acetal of formaldehyde.

7. The process of claim 1 wherein the acetal is formed in situ by admixing an aldehyde of the structure:

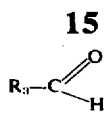
with an alcohol having the structure selected from the group consisting of $R_5OH$ and $R_6OH$ and mixtures thereof wherein $R_3$ is hydrogen or lower alkyl and $R_5$ and $R_6$ are each lower alkyl.
8. The process of claim 7 wherein $R_3$ is hydrogen.
9. The process of claim 7 wherein $R_5$ and $R_6$ are each n-hexyl.
10. The process of claim 7 wherein $R_5$ and $R_6$ are each methyl.
* * * * *